(12) United States Patent
Luten

(10) Patent No.: US 12,510,780 B2
(45) Date of Patent: Dec. 30, 2025

(54) REARVIEW ASSEMBLY FOR A VEHICLE HAVING A REFLECTOR TRANSMISSIVE TO INFRARED LIGHT AND INCORPORATING SILICON

(71) Applicant: Gentex Corporation, Zeeland, MI (US)

(72) Inventor: Henry A. Luten, Zeeland, MI (US)

(73) Assignee: GENTEX CORPORATION, Zeeland, MI (US)

( * ) Notice: Subject to any disclaimer, the term of this patent is extended or adjusted under 35 U.S.C. 154(b) by 0 days.

(21) Appl. No.: 18/654,046

(22) Filed: May 3, 2024

(65) Prior Publication Data

US 2024/0369875 A1 Nov. 7, 2024

Related U.S. Application Data

(60) Provisional application No. 63/499,763, filed on May 3, 2023.

(51) Int. Cl.
| | | |
|---|---|---|
| *B60R 1/08* | (2006.01) | |
| *G02F 1/1335* | (2006.01) | |
| *G02F 1/157* | (2006.01) | |
| *B60R 1/12* | (2006.01) | |
| *G06V 40/19* | (2022.01) | |

(52) U.S. Cl.
CPC ........ *G02F 1/133555* (2013.01); *B60R 1/088* (2013.01); *G02F 1/157* (2013.01); *B60R 2001/1253* (2013.01); *G02F 2203/11* (2013.01); *G06V 40/19* (2022.01)

(58) Field of Classification Search
CPC ............... G02F 1/133555; G02F 1/157; G02F 2203/11; B60R 1/088; B60R 2001/1253; G06V 40/19
See application file for complete search history.

(56) References Cited

U.S. PATENT DOCUMENTS

| | | | |
|---|---|---|---|
| 10,766,422 B2 | 9/2020 | Gao et al. | |
| 2004/0229049 A1* | 11/2004 | Boire | B32B 17/10788 |
| | | | 428/428 |
| 2006/0050356 A1 | 3/2006 | Varaprasad et al. | |
| 2018/0321546 A1* | 11/2018 | Sakai | G02B 5/3025 |
| 2019/0071019 A1 | 3/2019 | Baur et al. | |
| 2019/0094642 A1 | 3/2019 | Saenger Nayver et al. | |
| 2019/0217782 A1 | 7/2019 | Weller et al. | |
| 2022/0089091 A1* | 3/2022 | Neuman | G02B 5/0816 |

FOREIGN PATENT DOCUMENTS

WO   WO-2022241423 A1 * 11/2022 ............... B60R 1/04

* cited by examiner

*Primary Examiner* — Donald L Raleigh
(74) *Attorney, Agent, or Firm* — Price Heneveld LLP; Brian James Brewer

(57) ABSTRACT

A rearview assembly for a vehicle is provided including a mirror element. The mirror element includes a substrate having a front surface and a rear surface and a transflective coating associated with one of the front surface and the rear surface of the substrate. The transflective coating including a first layer having a high refractive index, a second layer having a low refractive index, a third layer comprising silicon, a fourth layer having a low refractive index, and a fifth layer having a high refractive index. The mirror element may be an electro-optic mirror element.

20 Claims, 7 Drawing Sheets

REARVIEW ASSEMBLY FOR A VEHICLE HAVING A REFLECTOR TRANSMISSIVE TO INFRARED LIGHT AND INCORPORATING SILICON

CROSS-REFERENCE TO RELATED APPLICATION

This application claims priority under 35 U.S.C. § 119 (e) upon U.S. Provisional Patent Application No. 63/499,763, entitled "REARVIEW ASSEMBLY FOR A VEHICLE HAVING A REFLECTOR TRANSMISSIVE TO INFRARED LIGHT AND INCORPORATING SILICON" filed on May 3, 2023, by Henry A. Luten, the entire disclosure of which is incorporated herein by reference.

TECHNOLOGICAL FIELD

The present invention concerns reflective coatings for optical elements and, more particularly, relates to an electro-optic rearview assembly for vehicles.

SUMMARY OF THE INVENTION

It is one aspect of the present disclosure to provide an electro-optic mirror element comprising: a first substrate having a first surface and a second surface; a second substrate having a third surface and a fourth surface; a chamber defined between the second surface of the first substrate and the third surface of the second substrate; an electro-optic medium disposed within the chamber; a first transparent electrode associated with the second surface of the first substrate; a second transparent electrode associated with the third surface of the second substrate; and a transflective coating associated with one of the third surface and the fourth surface of the second substrate. The transflective coating comprising a first layer having a high refractive index, a second layer having a low refractive index, a third layer comprising silicon, a fourth layer having a low refractive index, and a fifth layer having a high refractive index.

It is another aspect of the present disclosure to provide a mirror element, comprising: a substrate having a front surface and a rear surface and a transflective coating associated with one of the front surface and the rear surface of the substrate. The transflective coating comprising a first layer having a high refractive index, a second layer having a low refractive index, a third layer comprising silicon, a fourth layer having a low refractive index, and a fifth layer having a high refractive index.

According to another aspect of the invention, a rearview assembly for a vehicle is provided where the rearview assembly comprises a mirror element and an image sensor. The mirror element comprising: a first substrate having a first surface and a second surface, and a transflective coating positioned behind the first substrate, the transflective coating comprising a first layer having a high refractive index, a second layer having a low refractive index, a third layer comprising silicon, a fourth layer having a low refractive index, and a fifth layer having a high refractive index. The image sensor is positioned behind the mirror element for capturing images through the mirror element and the transflective coating, the image sensor being sensitive to infrared light.

These and other features, advantages, and objects of the present device will be further understood and appreciated by those skilled in the art upon studying the following specification, claims, and appended drawings.

BRIEF DESCRIPTION OF THE DRAWINGS

The embodiments will now be described with reference to the following drawings, in which.

The components in the figures are not necessarily to scale, emphasis instead being placed upon illustrating the principles described herein.

DETAILED DESCRIPTION OF EMBODIMENTS

Figure 1:
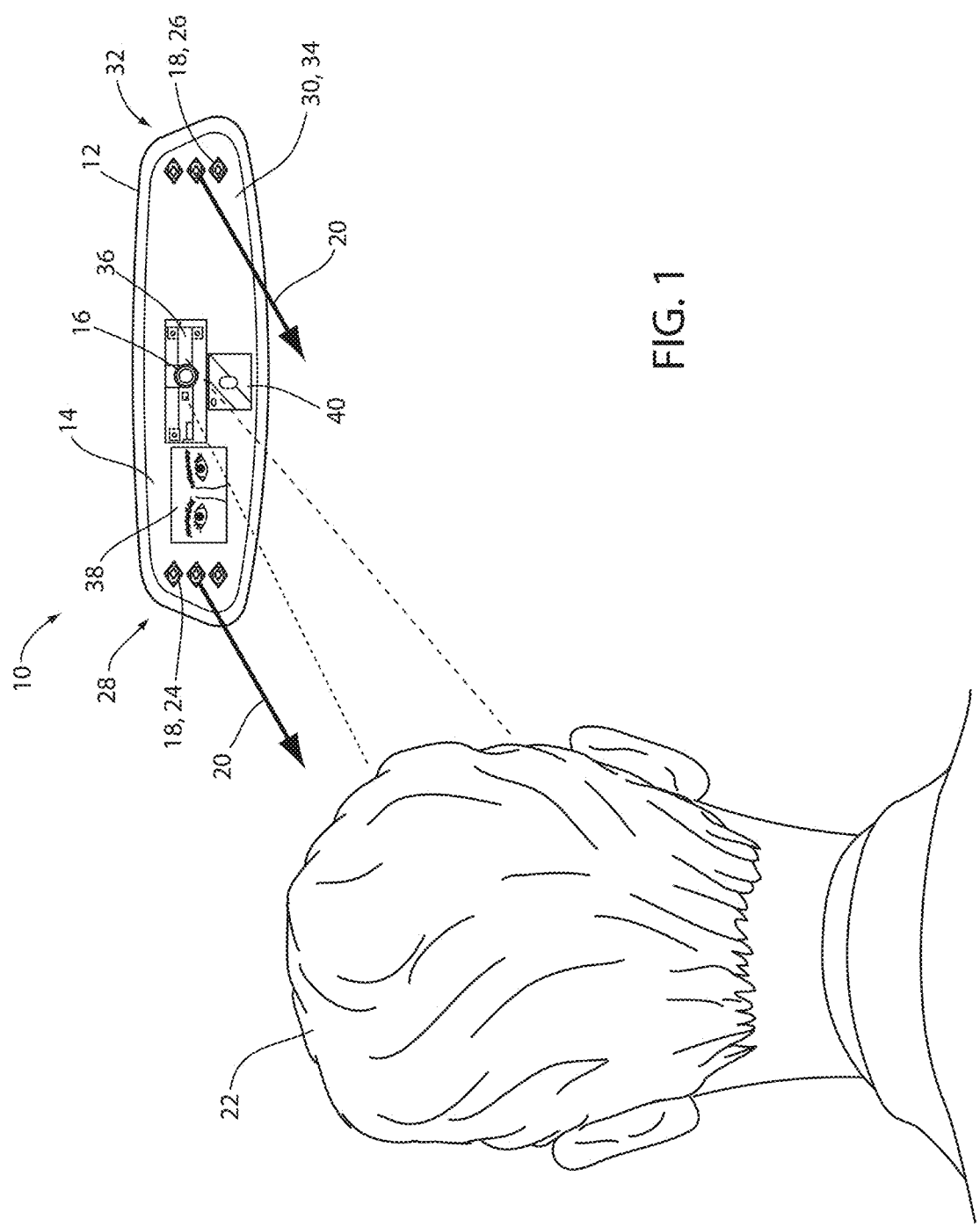
FIG. 1 is a projected view of an electro-optic mirror element incorporated in an interior rearview mirror assembly.

For purposes of description herein, the terms "upper," "lower," "right," "left," "rear," "front," "vertical," "horizontal," and derivatives thereof shall relate to the rearview assembly as oriented in FIG. 1. Unless stated otherwise, the term "front" shall refer to the surface of the element closer to an intended viewer of the rearview mirror assembly, and the term "rear" shall refer to the surface of the element further from the intended viewer of the rearview mirror assembly. However, it is to be understood that the invention may assume various alternative orientations, except where expressly specified to the contrary. It is also to be understood that the specific devices and processes illustrated in the attached drawings and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

The terms "including," "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element preceded by "comprises a . . . " does not, without more constraints, preclude the existence of additional identical elements in the process, method, article, or apparatus that comprises the element.

As defined herein, "approximately" and "about," when used in reference to angles, proportions, and the like, may, in some embodiments, mean within plus or minus ten percent of the stated value. In other embodiments, "approximately" and "about," when used in reference to angles, proportions, and the like, may mean within plus or minus five percent of the stated value. In further embodiments, "approximately" and "about," when used in reference to angles, proportions, and the like, may mean within plus or minus three percent of the stated value. In yet other embodiments, "approximately" and "about," when used with reference to angles, proportions, and the like, may mean within plus or minus one percent of the stated value.

In discussing color distributions (i.e., spectra of light), it is useful to refer to the Commission Internationale de l'Eclairage's (CIE) 1976 CIELAB Chromaticity Diagram (commonly referred to as the L*a*b* chart or quantification scheme). The technology of color is relatively complex, but a fairly comprehensive discussion is given by F. W. Billmeyer and M. Saltzman in Principles of Color Technology, 2nd Edition, J. Wiley and Sons Inc. (1981). The present disclosure, as it relates to color technology and uses appropriate terminology, generally follows that discussion. As used in this application, Y (sometimes also referred to as Cap Y), represents either the overall reflectance or the overall transmittance, depending on context. L*, a*, and b* can be used to characterize parameters of light in either transmission or reflection. According to the L*a*b* quantification scheme, L* represents brightness and is related to the eye-weighted value of either reflectance or transmittance (also known as normalized Y Tristimulus value) by the Y Tristimulus value of a white reference, Yref: L*=116*(Y/Yref)−16. The a*-parameter is a color coordinate that denotes the color gamut ranging from red (positive a*) to green (negative a*), and b* is a color coordinate that denotes the color gamut ranging from yellow and blue (positive and negative values of b*, respectively). As used in this application, Y (sometimes also referred to as Cap Y), represents the overall reflectance weighted to the human eye's sensitivity to visible light. For example, absorption spectra of an electrochromic medium, as measured at any particular voltage applied to the medium, may be converted to a three-number designation corresponding to a set of L*, a*, and b* values. To calculate a set of color coordinates such as (L*, a*, b*) values from the spectral transmission or reflectance, two additional parameters are required. One is the spectral power distribution of the source or illuminant. The present disclosure uses CIE Standard Illuminant A to simulate light from automobile headlamps and uses CIE Standard Illuminant D65 to simulate daylight. The second parameter is the spectral response of the observer. Many of the examples below refer to a (reflectance) value Y from the 1964 CIE Standard since it corresponds more closely to the spectral reflectance than L*. The value of "color magnitude," or C*, is defined as $C^* = \sqrt{(a^*)^2 + (b^*)^2}$ and provides a measure for quantifying color neutrality.

It is known to provide driver identification and driver monitoring systems in vehicles. One way to implement such systems is to provide an image sensor behind a transflective (partially reflective, partially transmissive) coating of a rearview mirror assembly. Some image sensors sense both visible light and infrared light. This requires that the transflective coating have sufficient transmission in both the visible and infrared spectral bands. Further, to effectively function as a rearview mirror, the transflective coating should also have sufficient reflectance over the visible band. To address these challenges, the Applicant has developed a rearview mirror element having transflective coating made of multiple layers of thin films of alternating high and low refractive indices. Such a transflective coating is disclosed in U.S. Pat. No. 10,766,422 B2, the entire disclosure of which is incorporated by reference. The present disclosure provides for an improved transflective coating providing for better optical performance and the ability to form the transflective coating using an inline coater rather than a drum coater. Before describing the inventive transflective coatings, a description is first provided of a scanning apparatus incorporated into a rearview mirror assembly.

Referring to FIG. 1, the disclosure may provide for a scanning apparatus 10 operable to perform an identification function. In an exemplary embodiment, the scanning apparatus 10 may be incorporated in a rearview mirror assembly 12 for an automotive vehicle. The rearview mirror assembly 12 may include a mirror element 14 that may be an electro-optic mirror element or a prismatic mirror element. The electro-optic element 14 may comprise an electrochromic (EC) mirror element or a liquid crystal mirror element. In this configuration, the electro-optic element 14 may vary in reflectivity in response to a control signal from a controller. The control signal may change an electrical potential supplied to the electro-optic element 14 to control the reflectivity.

The scanning apparatus 10 may be configured to process and/or control an identification function. The identification function may comprise an eye-scan or retinal identification function or facial recognition. In this configuration, the scanning apparatus 10 may provide for the interior rearview mirror assembly 12 to be configured to identify an operator or passenger of a vehicle based on the eye-scan or facial recognition identification functions. The identification function may be processed by the controller and/or communicated from the controller to one or more vehicle systems to provide for an identification of the operator or passenger of the vehicle.

The eye-scan-identification function may utilize an infrared illumination of an iris of an eye for the identification. The illumination of the eye(s) may be optimized in conditions allowing for a high optical transmittance in the near infrared (NIR) range. Accordingly, the disclosure provides for a mirror element that may have a high light transmittance in wavelengths ranging from about 800 nm to 1000 nm in the optical spectrum. Additionally, in some implementations, the electro-optic assembly may comprise a plurality of light sources configured to illuminate at least one iris of the operator of the vehicle.

To provide for the eye-scan-identification function, for example an iris or retinal scan, an image sensor 16 may be disposed proximate a rear surface of the electro-optic assembly. The image sensor 16 may correspond to, for example, a digital charge-coupled device (CCD) or complementary metal-oxide-semiconductor (CMOS) active pixel sensor, although not be limited to these exemplary devices. The image sensor 16 may be configured to be able to detect light projected from at least one light source 18, which may correspond to one or more infrared emitters configured to output an emission 20 of light in the NIR range. In this configuration, the image sensor 16 may be configured to selectively activate the one or more infrared emitters corresponding to the at least one light source 18 to illuminate the iris, such that an identity of an operator (driver) 22 of the vehicle may be determined.

The system 10 may further be used for driver and/or cabin monitoring purposes as a driver monitoring system (DMS). Such a DMS may detect whether the driver 22 appears drowsy or falls asleep while driving the vehicle. The DMS may also monitor for inattentiveness and other driver states. In addition, the DMS may monitor the presence/absence of a driver.

The infrared emitters or the light sources 18 may correspond to a plurality of infrared emitter banks. Each of the infrared emitter banks may comprise a plurality of light emitting diodes, which may be grouped in a matrix or otherwise grouped and disposed behind a rear surface of the electro-optic device. In an exemplary embodiment, the plurality of light sources 18 may correspond to a first emitter bank 24 and a second emitter bank 26. The first emitter bank 24 may be configured to output the emission in the NIR range from a first side portion 28 of a front surface 30 of the mirror element 14. The second emitter bank 26 may be configured to output the emission in the NIR range from a second side portion 32 of the front surface 30 of the mirror element 14, which may comprise an electro-optic mirror element 34. In this configuration, the scanning apparatus 10 may be configured to illuminate the eyes of the operator 22, such that the image sensor 16 may capture an image of the irises of the eyes.

The image sensor 16 may be disposed on a circuit board 36, for example a printed circuit board in communication with a controller. The controller may further be in communication with various devices that may be incorporated in the vehicle via the communication bus or any other suitable communication interface. The controller may correspond to one or more processors or circuits, which may be configured to process image data received from the image sensor 16. In this configuration, the image data may be communicated from the image sensor 16 to the controller. The controller may process the image data with one or more algorithms configured to determine an identity of the operator of the vehicle.

The controller may further be in communication with a display 38. The display 38 may be disposed in the mirror assembly 12 behind the rear surface. The controller may be operable to display the image data received from the image sensor 16, such that the operator may view the image data. In this configuration, the operator 22 may adjust a position of the eyes shown on the display 38 to position the eyes such that the image data may include the necessary features required to identify the operator. In an exemplary embodiment, the features required to identify the operator of the vehicle may correspond to features of the eyes of the operator 22 (e.g., the irises).

The display 38 may correspond to a partial or a full display mirror configured to display an image data through at least a portion of the mirror assembly 12. The display 38 may be constructed utilizing various technologies, for example LCD, LED, OLED, plasma, DLP or other display technology. Examples of display assemblies that may be utilized with the present disclosure may include U.S. Pat. No. 6,572,233 "Rearview Mirror With Display," U.S. Pat. No. 8,237,909 entitled "Vehicular Rearview Mirror Assembly Including Integrated Backlighting for a Liquid Crystal Display (LCD)," U.S. Pat. No. 8,411,245 "Multi-display Mirror System and Method for Expanded View Around a Vehicle," and U.S. Pat. No. 8,339,526 "Vehicle Rearview Mirror Assembly Including a High Intensity Display," which are incorporated herein by reference in their entirety.

The scanning apparatus 10 may further comprise an indicator 40 in the mirror assembly 12. The indicator 40 may be in communication with the controller and configured to output a signal to identify a state of the scanning apparatus 10 and/or a rearview camera. The indicator may correspond to a light source that may be operable to flash and/or change colors to communicate a state of the scanning apparatus 10. The indicator 40 may correspond to a light emitting diode (LED), and in an exemplary embodiment, the indicator 40 may correspond to a red, green, and blue (RGB) LED operable to identify the state of the scanning apparatus 10 by outputting one of more colors of light.

Figure 2:
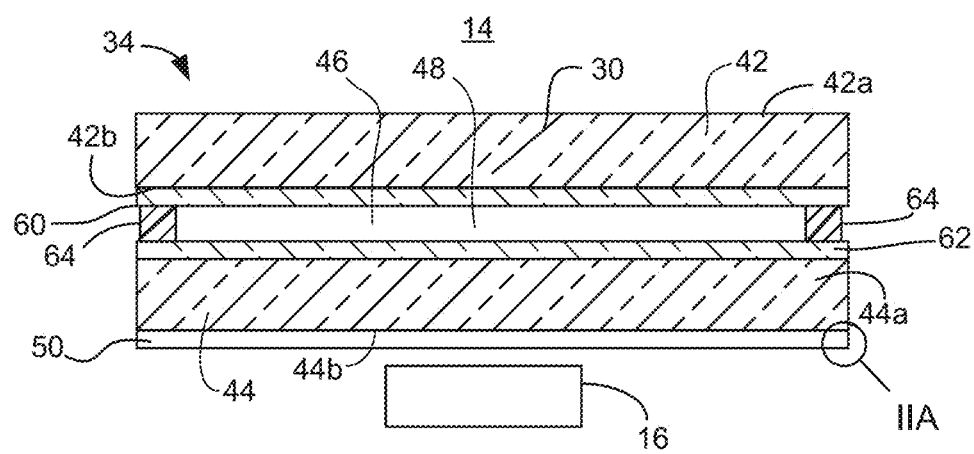
FIG. 2 is a cross-sectional view of an embodiment of an electro-optic mirror element.

Referring to FIG. 2, a cross-sectional view of a mirror element 14 is shown. The mirror element 14 is configured as an electro-optic assembly 34. The electro-optic mirror element 34 may include a first substrate 42 having a first surface 42a and a second surface 42b. The electro-optic mirror element 34 may further comprise a second substrate 44 having a third surface 44a and a fourth surface 44b. The first substrate 42 and the second substrate 44 may define a chamber 46 therebetween and may be substantially parallel. The first surface 42a and the third surface 44a may be oriented toward the front surface 30 of the mirror assembly 12. The second surface 42b and the fourth surface 44b may be oriented toward a rear surface of the mirror assembly 12.

The chamber 46 may contain an electro-optic medium 48, such as, but not limited to, an electrochromic medium or a liquid crystal medium. The chamber 46 may be completely or partially filled with the medium 48. The electro-optic mirror element 34 further includes a first transparent electrode 60 associated with the second surface 42b of the first substrate 42 and a second transparent electrode 62 associated with the third surface 44a of the second substrate 44. The mirror assembly 12 may be in communication with a dimming controller via electrical contacts coupled to the electrodes 60 and 62 and may comprise various seals 64 to retain the medium 48 in the chamber 46. In this configuration, the electro-optic mirror element 34 may be configured to vary in reflectance in response to a control signal received from the controller via the electrical contacts.

The first and second transparent electrodes 60 and 62 may be made of a transparent conductive oxide (TCO) such as indium tin oxide (ITO) or the like.

Figure 2A:
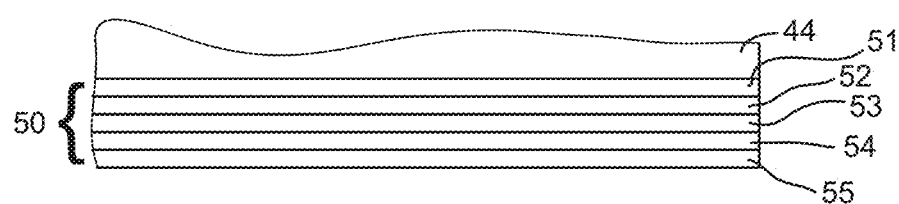
FIG. 2A is an enlarged cross-sectional view of a region IIA of the electro-optic mirror element shown in FIG. 2.

In the first embodiment shown in FIG. 2, the mirror element 14 includes a transflective coating 50 associated with the fourth surface 44b of the second substrate 44. As shown in the enlarged view of FIG. 2A, the transflective coating 50 may include a first layer 51 having a high refractive index, a second layer 52 having a low refractive index, a third layer 53 including silicon, a fourth layer 54 having a low refractive index, and a fifth layer 55 having a high refractive index.

The use of silicon as the third layer 53 in transflective coating 50 benefits the design in that it has a very high index (4.8), which broadens the reflection curve in the visible range, and provides somewhat unique IR properties which enhance the transmittance in the 850 nm to 950 nm range. To illustrate these advantages of including a silicon layer, two comparative examples are provided in Table 1 below.

TABLE 1

| Example 1 | | Example 2 | |
|---|---|---|---|
| Air | (nm) | Air | (nm) |
| $Nb_2O_5$ | 53.0 | $Nb_2O_5$ | 53.0 |
| $SiO_2$ | 85.5 | $SiO_2$ | 85.5 |
| $Nb_2O_5$ | 53.0 | Si | 25.7 |
| $SiO_2$ | 85.5 | $SiO_2$ | 85.5 |
| $Nb_2O_5$ | 53.0 | $Nb_2O_5$ | 53.0 |
| Glass | | Glass | |

Figure 3:
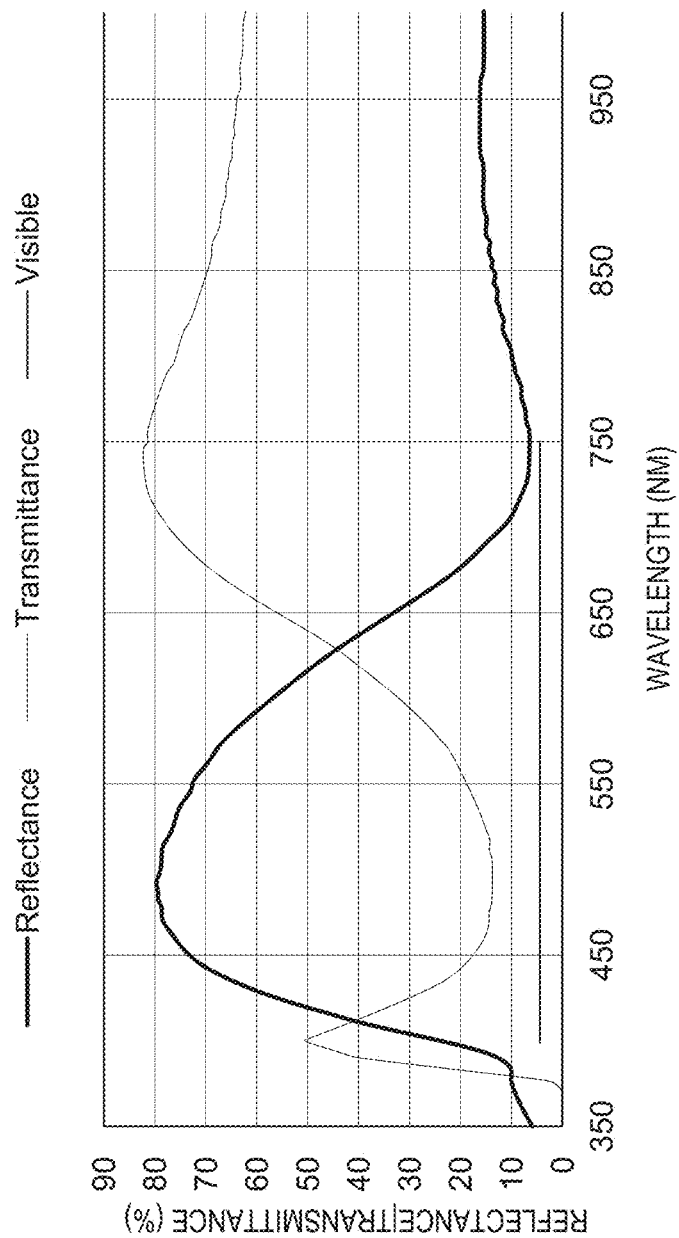
FIG. 3 is a graph of reflectance/transmittance versus wavelength for a first example of an electro-optic mirror element.
Figure 4:
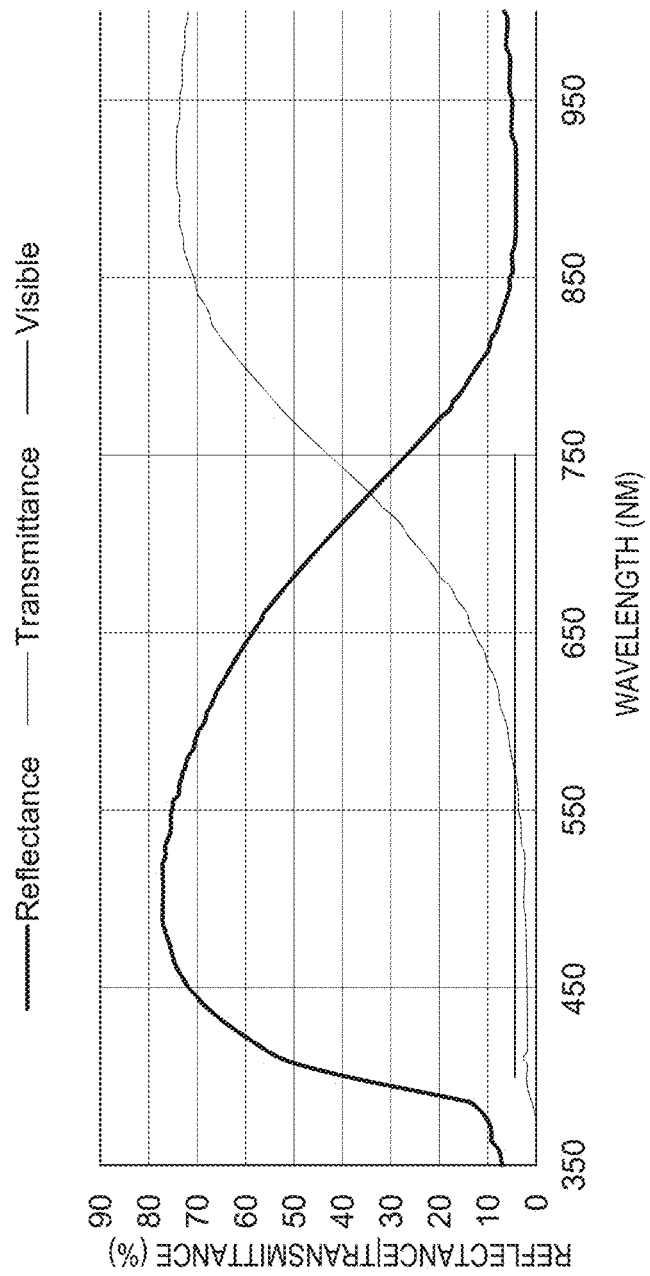
FIG. 4 is a graph of reflectance/transmittance versus wavelength for a second example of an electro-optic mirror element.

In Example 1, five alternating layers of $Nb_2O_5$ and $SiO_2$ are provided on a fourth surface (44b) of a glass substrate (44) of an electrochromic mirror element. In Example 2, the only difference is that the middle layer of $Nb_2O_5$ with a thickness of 53.0 nm (optical quarter wave at 550 nm) is replaced with a layer of silicon (Si) having a thickness of 25.7 nm (optical quarter wave at 550 nm). To demonstrate the improved optical performance, graphs of the reflectance/transmittance versus wavelength for Examples 1 and 2 are shown in FIGS. 3 and 4, respectively.

Example 1 provides good reflectance in the visible portion of the spectrum with good transmittance as well. The NIR transmittance peak has a maximum at 735 nm which is a shorter wavelength than optimum for an 850 nm or 950 nm imager, however the transmittance is still reasonable at those wavelengths. The reflected color is also quite green, as indicated by the a* value of −17 as shown in Table 3 below.

Example 2 provides good reflectance in the visible portion of the spectrum with somewhat low transmittance. The NIR transmittance peak has a maximum at 875 nm giving very good transmittance for an 850 nm or 950 nm sensor/imager. The broader reflectance peak in the visible portion of the spectrum significantly reduces the green reflected color compared to Example 1. The reflected and transmitted color data is shown in Table 3 below.

Figure 5:
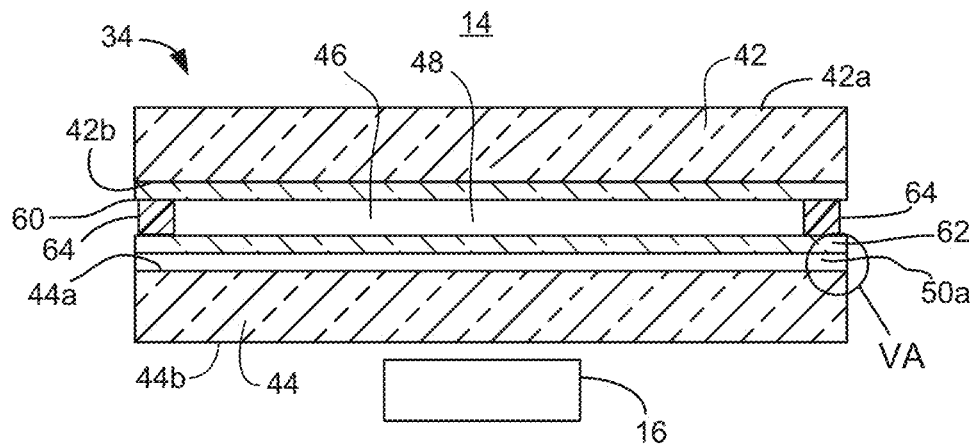
FIG. 5 is a cross-sectional view of another embodiment of an electro-optic mirror element.
Figure 5A:
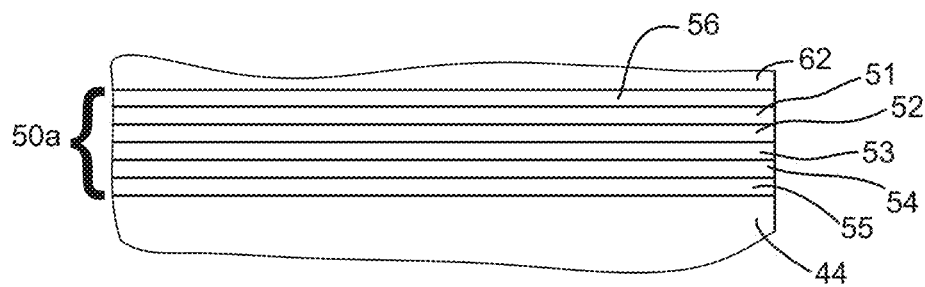
FIG. 5A is an enlarged cross-sectional view of a region VA of the electro-optic mirror element shown in FIG. 5.

A second embodiment is shown in FIG. 5 in which a transflective coating 50a is associated with the third surface 44a of the second substrate 44 and is provided between the third surface 44a and the second transparent electrode 62. As shown in the enlarged view of FIG. 5A, the transflective coating 50a may include a first layer 51 including a first material having a high refractive index, a second layer 52 including a second material having a low refractive index, a third layer 53 including silicon, a fourth layer 54 including the second material, a fifth layer 55 including the first material, and a sixth layer 56 including the second material positioned between the first layer 51 and the second transparent electrode 62. An example (Example 3) of the second embodiment is described in Table 2 below.

TABLE 2

| Example 3 (S3) | |
|---|---|
| EC Fluid | (nm) |
| ITO | 131 |
| $SiO_2$ | 85.5 |
| $Nb_2O_5$ | 53.0 |
| $SiO_2$ | 85.5 |
| Si | 25.7 |
| $SiO_2$ | 85.5 |
| $Nb_2O_5$ | 53.0 |
| Glass | |

Figure 6:
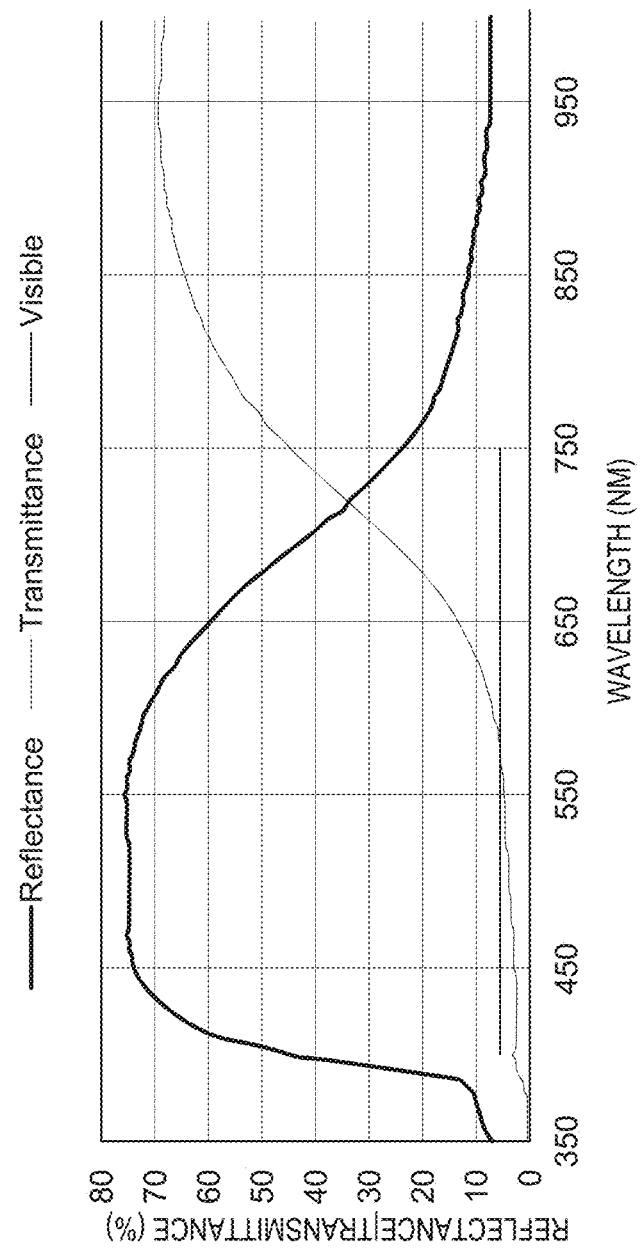
FIG. 6 is a graph of reflectance/transmittance versus wavelength for a third example of an electro-optic mirror element.

A graph of the reflectance/transmittance versus wavelength for Example 3 is shown in FIG. 6. The fourth surface 44b in this example is uncoated glass. This design further optimizes reflected color making it less green than Example 2 without a significant reduction of the NIR transmittance. The broader visible reflectance peak reduces the green reflected color. The NIR transmittance maximum is located at 950 nm making it optimized for the current ~950 nm-based monitoring systems. The reflected and transmitted color is shown in Table 3 below.

TABLE 3

| | Color data for the EC cells: | | | | | |
|---|---|---|---|---|---|---|
| | Example-1 | | Example-2 | | Example-3 | |
| | Reflectance | Transmittance | Reflectance | Transmittance | Reflectance | Transmittance |
| CIE-Y | 68.4 | 22.7 | 72.8 | 4.5 | 73.4 | 5.2 |
| L* | 86.2 | 54.8 | 88.3 | 25.3 | 88.6 | 27.2 |
| a* | −17.3 | 27.3 | −7.9 | 15.0 | −4.8 | 11.0 |
| b* | −2.0 | 5.3 | 2.4 | 14.1 | 1.1 | 15.0 |

Figure 7:
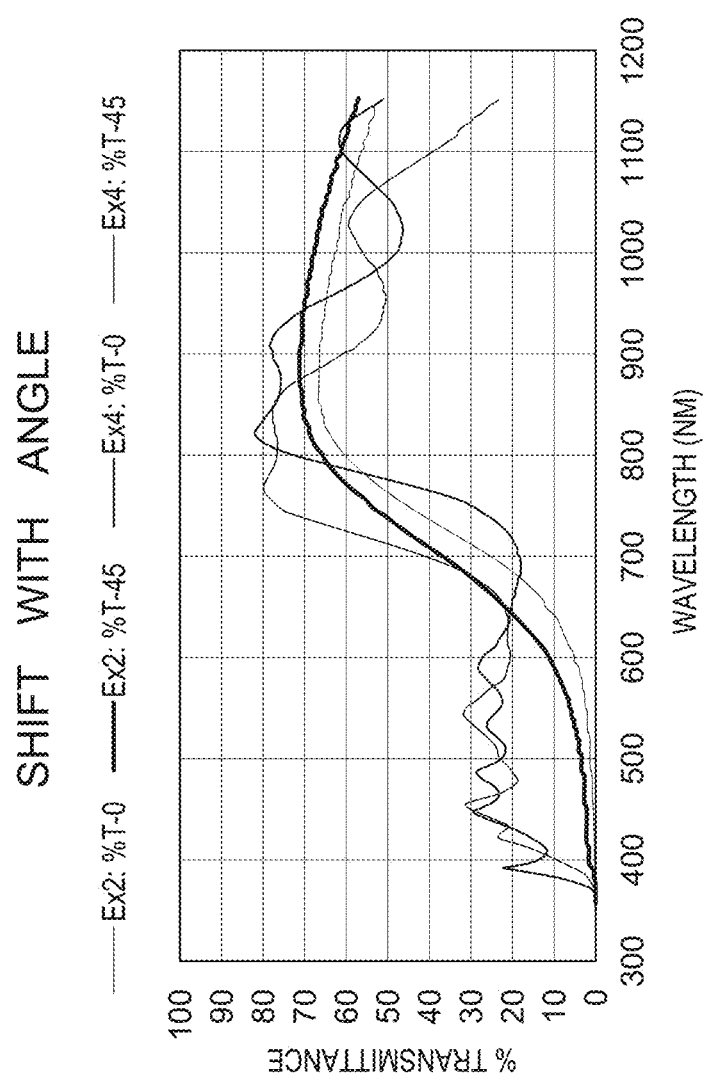
FIG. 7 is a comparative graph of transmittance versus wavelength for the second example and a fourth example for two different angles of incidence.

One advantage provided by Examples 2 and 3 relative to more traditional multilayer filter designs is the reduced shift in optical cutoff with angle. A more traditional multilayer design (Example 4) provided on the third surface 44a is given in Table 4 below. The shift in the transmittance cutoff with angle (normal versus 45 degrees incident angle) is shown in FIG. 7. The same shift is also shown for Example 2 for comparison. The cutoff shift at 50% transmittance is 65 nm for the multilayer design (Example 4), but only 25 nm for the silicon containing design (Example 2).

TABLE 4

| Example 4 multilayer filter stack: | |
|---|---|
| Air | (nm) |
| ITO | 150 |
| $Nb_2O_5$ | 98.68 |
| $SiO_2$ | 44.68 |
| $Nb_2O_5$ | 93.88 |
| $SiO_2$ | 128.09 |
| $Nb_2O_5$ | 42.22 |
| $SiO_2$ | 120.55 |
| $Nb_2O_5$ | 93.22 |
| $SiO_2$ | 64.68 |
| $Nb_2O_5$ | 57.38 |
| $SiO_2$ | 34.36 |
| $Nb_2O_5$ | 62.87 |
| $SiO_2$ | 92.32 |
| $Nb_2O_5$ | 22.56 |
| $SiO_2$ | 136.92 |
| $Nb_2O_5$ | 143.27 |
| Glass | |

Examples 2 and 3 are advantageous in that they are compatible with an inline coater due to their low number of layers and thus do not require deposition using a drum coater.

Tables 1, 2, and 4 provide detailed, representative examples of stack designs of dielectric transflective coatings that provide appropriate visible transflective properties and enhanced NIR transmittance. In these examples, the high refractive index (H) materials are $Nb_2O_5$ and silicon, and the low refractive index (L) material is $SiO_2$. It should be understood that these examples are not meant to be limiting and other materials may be used. For example, $TiO_2$, $ZrO_2$, $Ta_2O_5$. Alternate dielectric coatings may have a quantity of layers between 3 and 14 or more than 14 layers. The number of layers needed to achieve the design goals will vary with the selection of the high and low refractive index materials. Fewer layers may be needed as the difference in refractive index between the two materials increase. Conversely, more layers may be needed if the refractive index difference is less. The refractive index difference may be greater than about 0.4, greater than about 0.6, or greater than about 0.8. Additional materials may be added which have refractive indices different than the high and low index materials.

In some embodiments, the mirror element 14 may be an electro-optic element or an element such as a prism. As noted above, one non-limiting example of an electro-optic element is an electrochromic medium, which includes at least one solvent, at least one anodic material, and at least one cathodic material. Both of the anodic and cathodic materials are electroactive and at least one of them is electrochromic. It will be understood that regardless of its ordinary meaning, the term "electroactive" will be defined herein as a material that undergoes a modification in its oxidation state upon exposure to a particular electrical potential difference. Additionally, it will be understood that the term "electrochromic" will be defined herein, regardless of its ordinary meaning, as a material that exhibits a change in its extinction coefficient at one or more wavelengths upon exposure to a particular electrical potential difference. Electrochromic components, as described herein, include materials whose color or opacity are affected by electrical current, such that when the electrical current is applied to the material, the color or opacity change from a first phase to a second phase. The electrochromic component may be a single-layer, single-phase component, multi-layer component, or multi-phase component, as described in U.S. Pat. No. 5,928,572 entitled "Electrochromic Layer And Devices Comprising Same," U.S. Pat. No. 5,998,617 entitled "Electrochromic Compounds," U.S. Pat. No. 6,020,987 entitled "Electrochromic Medium Capable Of Producing A Preselected Color," U.S. Pat. No. 6,037,471 entitled "Electrochromic Compounds," U.S. Pat. No. 6,141,137 entitled "Electrochromic Media for Producing A Pre-selected Color," U.S. Pat. No. 6,241,916 entitled "Electrochromic System," U.S. Pat. No. 6,193,912 entitled "Near Infrared-Absorbing Electrochromic Compounds and Devices Comprising Same," U.S. Pat. No. 6,249,369 entitled "Coupled Electrochromic Compounds With Photostable Dication Oxidation States," U.S. Pat. No. 6,137,620 entitled "Electrochromic Media With Concentration-Enhanced Stability, Process for the Preparation Thereof and Use In Electrochromic Devices," U.S. Pat. No. 6,519,072, entitled "Electrochromic Device," and International Patent Application Serial Nos. PCT/US98/05570 entitled "Electrochromic Polymeric Solid Films, Manufacturing Electrochromic Devices Using Such Solid Films, and Processes for Making Such Solid Films And Devices," PCT/EP98/03862 entitled "Electrochromic Polymer System," and PCT/US98/05570 entitled "Electrochromic Polymeric Solid Films, Manufacturing Electrochromic Devices Using Such Solid Films, and Processes For Making Such Solid Films and Devices," which are herein incorporated by reference in their entirety.

According to one aspect of the invention, an electro-optic mirror element comprises: a first substrate having a first surface and a second surface; a second substrate having a third surface and a fourth surface; a chamber defined between the second surface of the first substrate and the third surface of the second substrate; an electro-optic medium disposed within the chamber; a first transparent electrode associated with the second surface of the first substrate; a second transparent electrode associated with the third surface of the second substrate; and a transflective coating associated with one of the third surface and the fourth surface of the second substrate. The transflective coating comprising a first layer having a high refractive index, a second layer having a low refractive index, a third layer comprising silicon, a fourth layer having a low refractive index, and a fifth layer having a high refractive index.

According to various aspects, the disclosure may implement one or more of the following features or configurations in various combinations:
  wherein at least one of the first and fifth layers comprises $Nb_2O_5$;
  wherein at least one of the second and fourth layers comprises $SiO_2$;
  wherein the transflective coating is associated with the fourth surface;
  wherein the transflective coating is associated with the third surface and is positioned between the second transparent electrode and the third surface of the second substrate, wherein a sixth layer having a low refractive index is positioned between the second transparent electrode and the first layer of the transflective coating;
  wherein the layers of the transflective coating are applied using an inline coater; and
  wherein the electro-optic mirror element is incorporated into a rearview assembly for a vehicle.

According to another aspect of the invention, a mirror element comprises: a substrate having a front surface and a rear surface and a transflective coating associated with one of the front surface and the rear surface of the substrate. The transflective coating comprising a first layer having a high refractive index, a second layer having a low refractive index, a third layer comprising silicon, a fourth layer having a low refractive index, and a fifth layer having a high refractive index.

According to various aspects, the disclosure may implement one or more of the following features or configurations in various combinations:
  wherein at least one of the first and fifth layers comprises $Nb_2O_5$;
  wherein at least one of the second and fourth layers comprises $SiO_2$;
  wherein the transflective coating is associated with the rear surface;
  wherein the layers of the transflective coating are applied using an inline coater; and
  wherein the electro-optic mirror element is incorporated into a rearview assembly for a vehicle.

According to another aspect of the invention, a rearview assembly for a vehicle is provided where the rearview assembly comprises a mirror element and an image sensor. The mirror element comprising: a first substrate having a first surface and a second surface, and a transflective coating positioned behind the first substrate, the transflective coating comprising a first layer having a high refractive index, a second layer having a low refractive index, a third layer comprising silicon, a fourth layer having a low refractive index, and a fifth layer having a high refractive index. The image sensor is positioned behind the mirror element for capturing images through the mirror element and the transflective coating, the image sensor being sensitive to infrared light.

According to various aspects, the disclosure may implement one or more of the following features or configurations in various combinations:

wherein at least one of the first and fifth layers comprises $Nb_2O_5$;

wherein at least one of the second and fourth layers comprises $SiO_2$;

wherein the layers of the transflective coating are applied using an inline coater;

wherein the mirror element further comprises:

a second substrate having a third surface and a fourth surface;

a chamber defined between the second surface of the first substrate and the third surface of the second substrate;

an electro-optic medium disposed within the chamber;

a first transparent electrode associated with the second surface of the first substrate; and a second transparent electrode associated with the third surface of the second substrate, wherein the transflective coating associated with one of the third surface and the fourth surface of the second substrate;

wherein the transflective coating is associated with the fourth surface; and wherein the transflective coating is associated with the third surface and is positioned between the second transparent electrode and the third surface of the second substrate, wherein a sixth layer having a low refractive index is positioned between the second transparent electrode and the first layer of the transflective coating.

It will be understood by one having ordinary skill in the art that construction of the described invention and other components is not limited to any specific material. Other exemplary embodiments of the invention disclosed herein may be formed from a wide variety of materials, unless described otherwise herein.

For purposes of this disclosure, the term "coupled" (in all of its forms, couple, coupling, coupled, etc.) generally means the joining of two components (electrical or mechanical) directly or indirectly to one another. Such joining may be stationary in nature or movable in nature. Such joining may be achieved with the two components (electrical or mechanical) and any additional intermediate members being integrally formed as a single unitary body with one another or with the two components. Such joining may be permanent in nature or may be removable or releasable in nature unless otherwise stated.

It is also important to note that the construction and arrangement of the elements of the invention as shown in the exemplary embodiments is illustrative only. Although only a few embodiments of the present innovations have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts or elements shown as multiple parts may be integrally formed, the operation of the interfaces may be reversed or otherwise varied, the length or width of the structures and/or members or connector or other elements of the system may be varied, the nature or number of adjustment positions provided between the elements may be varied. It should be noted that the elements and/or assemblies of the system may be constructed from any of a wide variety of materials that provide sufficient strength or durability, in any of a wide variety of colors, textures, and combinations. Accordingly, all such modifications are intended to be included within the scope of the present innovations. Other substitutions, modifications, changes, and omissions may be made in the design, operating conditions, and arrangement of the desired and other exemplary embodiments without departing from the spirit of the present innovations.

It will be understood that any described processes or steps within described processes may be combined with other disclosed processes or steps to form structures within the scope of the present device. The exemplary structures and processes disclosed herein are for illustrative purposes and are not to be construed as limiting.

It is also to be understood that variations and modifications can be made on the aforementioned structures and methods without departing from the concepts of the present device, and further it is to be understood that such concepts are intended to be covered by the following claims unless these claims by their language expressly state otherwise.

The above description is considered that of the illustrated embodiments only. Modifications of the device will occur to those skilled in the art and to those who make or use the device. Therefore, it is understood that the embodiments shown in the drawings and described above are merely for illustrative purposes and not intended to limit the scope of the device, which is defined by the following claims as interpreted according to the principles of patent law, including the Doctrine of Equivalents.

What is claimed is:

1. An electro-optic mirror element, comprising:

a first substrate having a first surface and a second surface;

a second substrate having a third surface and a fourth surface;

a chamber defined between the second surface of the first substrate and the third surface of the second substrate;

an electro-optic medium disposed within the chamber;

a first transparent electrode associated with the second surface of the first substrate;

a second transparent electrode associated with the third surface of the second substrate; and a transflective coating associated with one of the third surface and the fourth surface of the second substrate, the transflective coating comprising a first layer having a high refractive index, a second layer having a low refractive index, a third layer consisting essentially of silicon, a fourth layer having a low refractive index, and a fifth layer having a high refractive index.

2. The electro-optic mirror element of claim 1, wherein at least one of the first and fifth layers comprises $Nb_2O_5$.

3. The electro-optic mirror element of claim 1, wherein at least one of the second and fourth layers comprises $SiO_2$.

4. The electro-optic mirror element of claim 1, wherein the transflective coating is associated with the fourth surface.

5. The electro-optic mirror element of claim 1 wherein the transflective coating is associated with the third surface and is positioned between the second transparent electrode and the third surface of the second substrate, wherein a sixth layer having a low refractive index is positioned between the second transparent electrode and the first layer of the transflective coating.

6. The electro-optic mirror element of claim 1, wherein the layers of the transflective coating are applied using an inline coater.

7. A rearview assembly for a vehicle, the rearview assembly comprising the electro-optic mirror element of claim 1.

8. A mirror element, comprising:
a substrate having a front surface and a rear surface; and
a transflective coating associated with one of the front surface and the rear surface of the substrate, the transflective coating comprising a first layer having a high refractive index, a second layer having a low refractive index, a third layer comprising silicon, a fourth layer having a low refractive index, and a fifth layer having a high refractive index, wherein the first and fifth layers are made of a different material than the third layer.

9. The mirror element of claim 8, wherein at least one of the first and fifth layers comprises $Nb_2O_5$.

10. The mirror element of claim 8, wherein at least one of the second and fourth layers comprises $SiO_2$.

11. The mirror element of claim 8, wherein the transflective coating is associated with the rear surface.

12. The mirror element of claim 8, wherein the layers of the transflective coating are applied using an inline coater.

13. A rearview assembly for a vehicle, the rearview assembly comprising the mirror element of claim 8.

14. A rearview assembly for a vehicle, the rearview assembly comprising:
a mirror element comprising:
a first substrate having a first surface and a second surface, and
a transflective coating positioned behind the first substrate, the transflective coating comprising a first layer having a high refractive index, a second layer having a low refractive index, a third layer comprising silicon, a fourth layer having a low refractive index, and a fifth layer having a high refractive index, wherein the third layer has a refractive index of 4.8; and
an image sensor positioned behind the mirror element for capturing images through the mirror element and the transflective coating, the image sensor being sensitive to infrared light.

15. The rearview assembly of claim 14, wherein at least one of the first and fifth layers comprises $Nb_2O_5$.

16. The rearview assembly of claim 14, wherein at least one of the second and fourth layers comprises $SiO_2$.

17. The rearview assembly of claim 14, wherein the layers of the transflective coating are applied using an inline coater.

18. The rearview assembly of claim 14, wherein the mirror element further comprises:
a second substrate having a third surface and a fourth surface;
a chamber defined between the second surface of the first substrate and the third surface of the second substrate;
an electro-optic medium disposed within the chamber;
a first transparent electrode associated with the second surface of the first substrate; and
a second transparent electrode associated with the third surface of the second substrate,
wherein the transflective coating is associated with one of the third surface and the fourth surface of the second substrate.

19. The rearview assembly of claim 18, wherein the transflective coating is associated with the fourth surface.

20. The rearview assembly of claim 18, wherein the transflective coating is associated with the third surface and is positioned between the second transparent electrode and the third surface of the second substrate, wherein a sixth layer having a low refractive index is positioned between the second transparent electrode and the first layer of the transflective coating.

* * * * *